United States Patent [19]
Lynn et al.

[11] 3,719,081
[45] March 6, 1973

[54] WASTEWATER SAMPLER
[75] Inventors: Lewis G. Lynn; David A. Quadrini, both of Rochester, N.Y.
[73] Assignee: Tri-Aid Sciences, Inc., Rochester, N.Y.
[22] Filed: Dec. 16, 1971
[21] Appl. No.: 208,644

[52] U.S. Cl. .................73/198, 73/206, 73/215, 73/421 B, 73/422 R
[51] Int. Cl. ...............................G01h 1/12
[58] Field of Search........73/421 B, 422 R, 198, 206, 73/215

[56] References Cited

UNITED STATES PATENTS

| | | | |
|---|---|---|---|
| 1,843,552 | 2/1932 | Gibson et al. | 73/424 |
| 2,983,147 | 5/1961 | Morgan | 73/424 |
| 3,269,180 | 8/1966 | Schreiber | 73/215 |
| 3,282,113 | 11/1966 | Sachnik | 73/422 |
| 3,535,929 | 10/1970 | Mondeil et al. | 73/206 |

Primary Examiner—S. Clement Swisher
Attorney—B. Edward Shlesinger et al.

[57] ABSTRACT

Effluent is discharged into a flume to flow past a selectively operable sampler device, and an adjacent probe, which develops and transmits to a remote control point a 4 to 20 milliamp signal the amplitude of which is proportionate to the effluent flow rate. At the control point the signal is applied to an integrator which produces an output voltage proportionate to the quantity (gallons) of effluent that has passed the probe in a preceding interval. Each time this voltage reaches a predetermined value a threshold circuit resets the integrator and pulses a first register to record the quantity of effluent for a given period, and simultaneously pulses a presettable counter, which produces a sampler enabling signal every time the counter reaches zero and resets. This enabling signal momentarily energizes a solenoid in a remote sampler to cause it to pump a sample of wastewater from the flume to a sample receptacle.

15 Claims, 4 Drawing Figures

INVENTORS
LEWIS G. LYNN
DAVID A. QUADRINI

INVENTORS
LEWIS G. LYNN
DAVID A. QUADRINI

WASTEWATER SAMPLER

This invention relates to wastewater sampling apparatus, and more particularly to remote control apparatus for automatically and periodically collecting samples from a stream of wastewater for pollution control purposes.

In an effort to combat or prevent further pollution of our rivers, streams and lakes, various states have passed laws requiring that the effluent of certain industrial plants, for example tanneries, be measured and sampled periodically. The samples are then analyzed; and the results are forwarded to a state authority charged with regulation of industrial wastes, or the like.

As a consequence of increased state regulation in these areas, there has been a growing need for more sophisticated and reliable equipment capable of monitoring industrial effluents, for example by automatically and periodically collecting samples of such effluents for test purposes. Heretofore various systems have been proposed for sampling streams of liquids or gases; but most such devices have been rather crude and highly inaccurate. Moreover, most such prior devices have not been completely automatic, and have required nearly constant maintenance or supervision.

It is an object of this invention to provide improved wastewater sampling apparatus capable of automatically and periodically collecting liquid samples from industrial wastewater or the like.

Another object of this invention is to provide automatic sampling apparatus capable of monitoring and recording the rate of flow of a liquid effluent, and automatically operative to collect liquid samples at intervals related to the flow rate of the effluent.

Another object of this invention is to provide remote control wastewater measuring and sampling apparatus capable of collecting wastewater samples in one location, and recording wastewater flow data at a remote location.

Still a further object of this invention is to provide remote controlled apparatus of the type described which is capable of sampling wastewater automatically at predetermined intervals that are proportionate to the rate of flow of the wastewater.

Other objects of this invention will be apparent hereinafter from the specification and from the recital of the appended claims, particularly when read in conjunction with the accompanying drawings.

Figure 1:
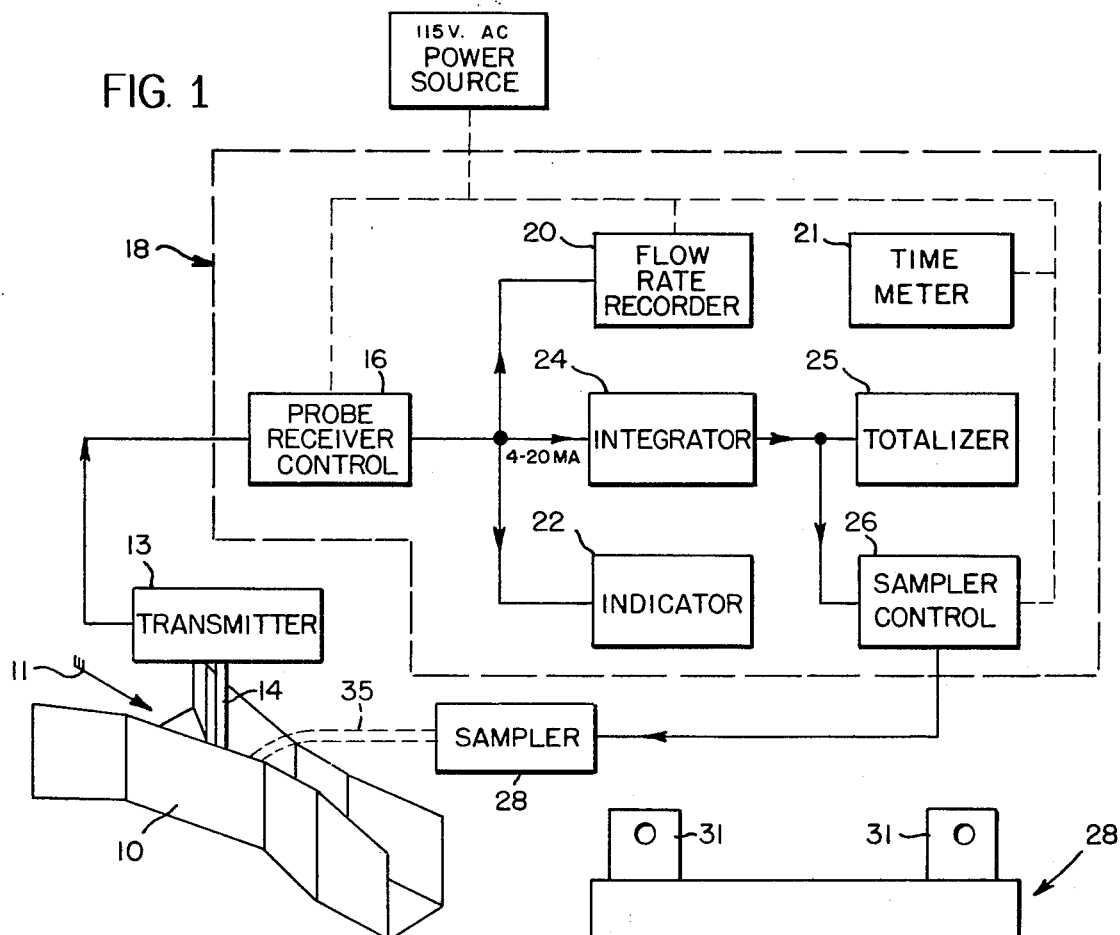
FIG. 1 is a diagrammatic view illustrating schematically remote controlled wastewater sampling apparatus made in accordance with one embodiment of this invention.

Referring now to the drawings by numerals of reference, and first to FIG. 1, 10 denotes a conventional weir, or flume, which is intended to be mounted in known manner at the discharge of the effluent from a factory, or the like, so that the wastewater flows through the flume in the direction indicated by the arrow 11. As a practical matter the discharge point of the effluent, and hence the flume 10, are usually located at a point remote from the associated factory to avoid subjecting its personnel to the odors often associated with such effluent.

Mounted adjacent the flume 10 is a transmitter 13, which forms part of a standard capacitance level measuring instrument of the type sold, for example, under the name Robertshaw Leve-Tel. This instrument includes a probe 14, which extends downwardly into the flume to detect the rate of flow of wastewater therethrough. This rate is converted into an electric signal that is transmitted by the transmitter 13 through a probe receiver control board 16, which is mounted on a control panel 18 located back at the factory or plant remote from flume 10. The characteristic of probe 14 is selected to match the flow function of the flume 10, so that for anticipated changes in the flow rate through the flume (i.e. for changes between predetermined high and low rates) the instrument will develop and transmit a linear signal of anywhere from 4 to 20 milliamps, depending upon the sensed flow rate. The transmitter 13 and its probe receiver control 16 can be mounted up to a mile apart from one another; and calibration of the complete instrument, as represented for example by the probe 14, transmitter 13 and receiver control 16, is accomplished in known manner by adjusting the fine and course zero and range adjusting elements (not illustrated) located at the receiver control 16.

Also mounted on the panel 18 remote from flume 10 to be responsive, as hereinafter described, to the signal output of the transmitter 13 is a flow rate recorder 20. This instrument permanently records on a paper chart or the like, the rate of flow of the wastewater through the flume 10 in gallons per minute. As described in greater detail hereinafter, the drive for the paper chart in this recorder is powered from an alternating current power source of, for example, 115 volts. This source also energizes a meter 21 which records the overall operating time of the apparatus in, for example, hours. The output of the transmitter 13 is also applied to an instantaneous flow indicator 22, which may be a milliameter calibrated to indicate at any instant the rate of flow of wastewater through the flume 10 in gallons per minute.

Also connected at the panel 18 to the output of the transmitter 13 is a integrator unit 24, the output of which is connected to a seven digit totalizer 25, which records in gallons the quantity of wastewater that passes through the flume 10 in a given period of time, and to a sampler control unit 26, which under certain conditions, described hereinafter, develops an output or enabling signal for an electrically operated sampler unit 28 that is located adjacent the flume 10 remote from panel 18.

Figure 2:
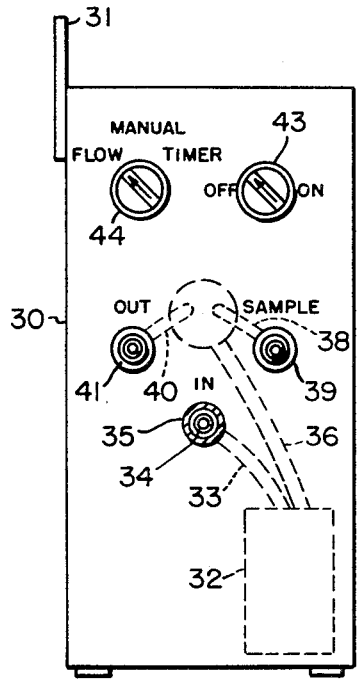
FIG. 2 is a front elevational view of a sampler, which forms part of this apparatus.
Figure 3:
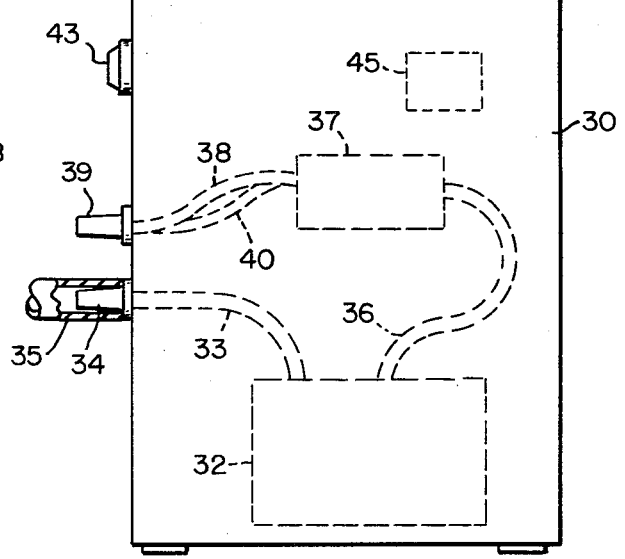
FIG. 3 is a side elevational view of this sampler.

Referring now to FIGS. 2 and 3, the sampler 28 comprises a housing 30 having on its upper end a pair of spaced brackets 31 for hanging or otherwise supporting the housing adjacent the flume 10. Mounted in housing 30 is a pump 32 having an inlet that is connected by a hose or pipe 33 with a tubular fitting 34, which projects from the front of the housing. Fitting 34 is connected by a further hose 35 with the wastewater that flows through the flume 10. The output of the pump 32 is connected by a hose 36 to a conventional, solenoid-operated valve 37, which is mounted in housing 30 adjacent the pump 32. Valve 37 has a first outlet connected by a hose 38 to a further tubular fitting 39 that projects from housing 30 above fitting 34; and a second outlet that is connected by a hose 40 to a tubular fitting 41 mounted adjacent the fitting 39.

Also mounted on the face of housing 30 is a manually operable OFF-ON switch 43; and a manually operable, three-position selector switch 44. As described hereinafter, switches 43 and 44 control a supply of power to the motor 32-1 for pump 32, to the solenoid 37-1 (FIG. 4), which operates valve 37, and to a conventional timer 45, which is mounted in housing 30 adjacent valve 37. Normally this valve is maintained in a position in which line 36 is connected to line 40, so that when the pump 32 is operating, water is drawn from the flume 10 through the hose 35, pump 32, valve 37, and fitting 41 to another hose (not illustrated), which empties back into the flume 10, so that the water drawn from the flume normally is recirculated back into the flume by the valve 37. However, when the solenoid 37-1 is energized, as hereinafter described, valve 37 diverts the water from the pump 32 and line 36 to the sample line 38 and fitting 39, which is connected in any conventional manner to a receptacle (not illustrated) that is used to preserve the sample of water drawn from the flume 10 by the pump 32.

Figure 4:
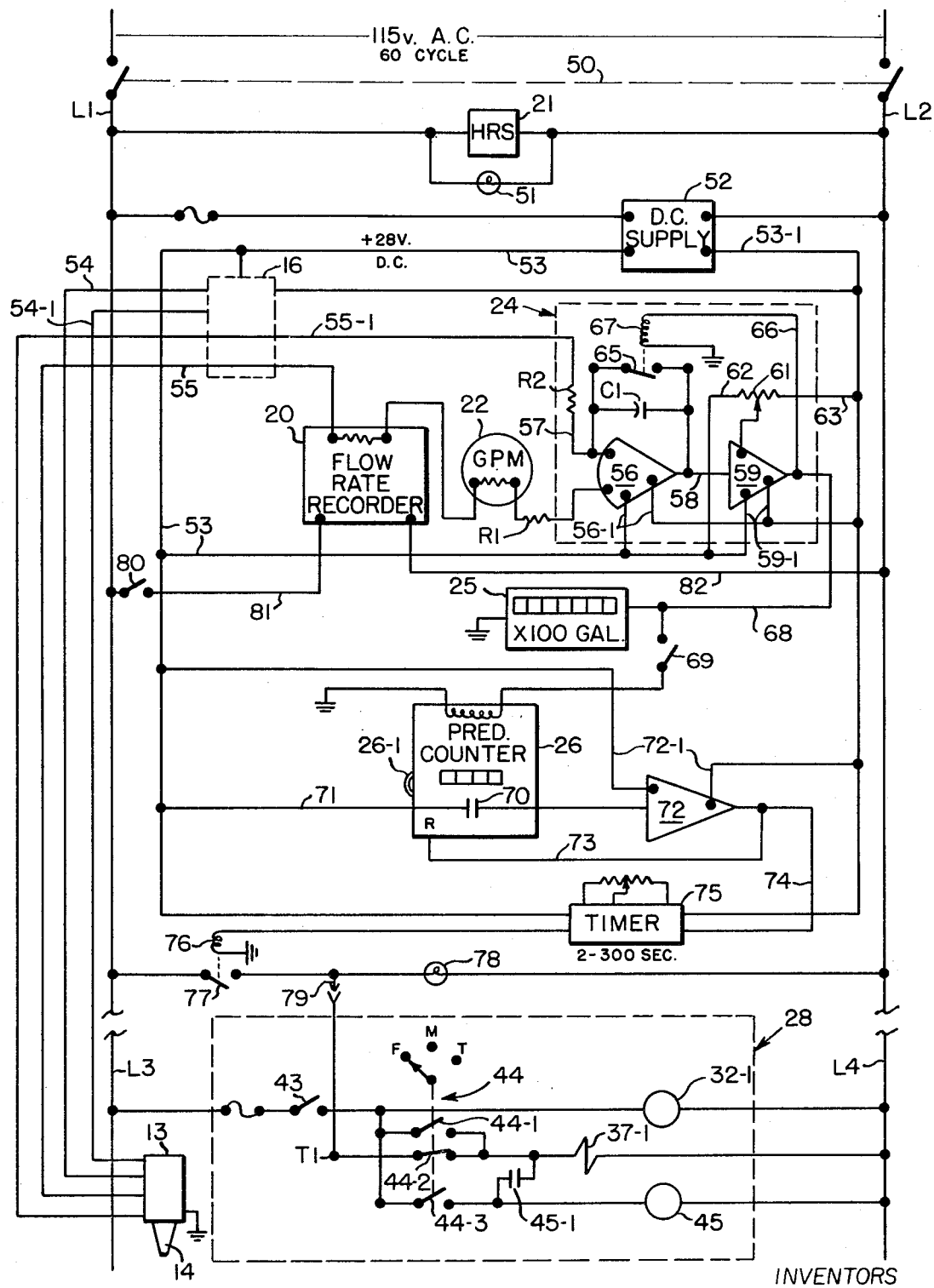
FIG. 4 is a schematic wiring diagram illustrating one manner in which the apparatus of this invention may be wired for operation.

Referring now to FIG. 4, 50 denotes a conventional, manually operable ON-OFF switch mounted at a convenient spot on the panel 18 to connect, when closed, an alternating current (AC) power supply, for example 115 volts, to the main power lines L1 and L2 in panel 18. The timing meter 21 is connected between lines L1 and L2 to record the total operating time of the system, when the switch 50 is closed. An indicator lamp 51 is connected in parallel with the meter 21 to indicate when power is being supplied to the panel 18. The power transformer (not illustrated) of a conventional direct current power supply 52 is also connected in known manner between lines L1 and L2 to produce a positive 28 volt DC power supply on line 53, and a negative potential on line 53-1, when switch 50 is closed. Lines 53 and 53-1 are connected in known manner to the receiver control 16 to supply DC power for the Robertshaw Level-Tel instrument; and the outputs of the zero and range adjusting elements of the control 16 are connected by lines 54 and 54-1 with the transmitter portion 13 of the instrument for calibrating purposes that form no part of this invention.

The 4 to 20 milliamp signal developed at the transmitter 13 is applied through a line 55 to the operating coil of the flow rate recorder 20, which may be of the type known as an Esterline/Angus Minicorder. Coil 20 is connected in series through the operating coil of the flow rate indicator 22, and a resistor R1 to one of the input terminals of a conventional high-gain DC amplifier 56, which forms part of the integrator unit 24. The other input terminal of this amplifier is connected through a line 57, a resistor R2, and line 55-1 to the signal ground on transmitter 13.

The output of amplifier 56 is connected by a line 58 with one of the inputs of a further DC amplifier 59, which also forms part of the integrator unit 24. The other input terminal to amplifier 59 is connected to a potentiometer 61, which is connected by lines 62 and 63 to the DC power supply lines 53 and 53-1, respectively. Connected in parallel across the amplifier 56 between lines 57 and 58 are a condenser C1, and a normally open relay switch 65. The output of amplifier 59 is connected by a line 66 through a relay coil 67 to ground, and by a line 68 to the input of register 25. Line 68 is also connected through a manually operable, single pole-single throw switch 69 with the operating coil of counter 26.

Counter 26 controls a normally open switch 70, which is connected at one side by line 71 to the DC power supply line 53, and at its opposite side to the input of a DC amplifier 72. The output of this amplifier is connected by a line 73 to the reset terminal of counter 26, and by a line 74 to the input of an adjustable timer 75, which forms part of a conventional time delay unit. As described hereinafter in greater detail, timer 75 controls a relay coil 76, which operates a normally open relay switch 77 that is connected in series with a sample indicator lamp 78 between the AC power supply lines L1 and L2.

Line L1 is adapted to be connected selectively through the switch 77 to remote control line 79, which in the embodiment illustrated is connected at one end between the switch 77 and the sample indicating lamp 78, and at its opposite end to a terminal T1 in the housing 30 of the remotely located sampler unit 28. At the situs of the weir 10, the sample unit 28 is supplied with power from an alternating current source represented in FIG. 4 by the lines L3 and L4. The sampler ON-OFF switch 43 is connected in series with the motor 32-1, which operates the pump 32, so that whenever switch 43 is closed, the pump 32 will operate.

The selector switch 44 has three contacts 44-1, 44-2 and 44-3, only one of which is closed at a time. Contact 44-1 is connected at one side between the switch 43 and the pump motor 32-1, and at its opposite side through the solenoid 37-1 to the line L4, so that whenever the switches 43 and 44-1 are closed, the pump motor 32-1 and solenoid 37-1 will be energized. Contact 44-2 is connected at one side to the terminal T1 and at its opposite side through the solenoid 37-1 to the line L4, so that whenever switch 44-2 is closed, the valve 37 may be operated to select the sample only when power is applied to the terminal T1 by the closing of switch 77. Switch contact 44-3 is connected at one side through the switch 43 to the line L3, and at its opposite side through the operating coil of the timer 45 to the line L4, so that when switches 43 and 44-3 are closed, the timer 45 is energized to control the sampler 28. The timer 45 controls a normally open switch 45-1, which is connected at one end between the switch 44-3 and the timer 45, and at its opposite end through the solenoid 37-1 to line L4. The timer 45 may be of a conventional variety, which, when energized, periodically closes switch 45-1 intermittently to energize solenoid 37-1 for predetermined intervals.

In the illustrated embodiment switch 44 is in a position in which it registers with the position F (FIG. 4), which corresponds to its "flow control" position, in which contacts 44-1 and 44-3 are open, and contact 44-2 is closed, so that the operation of solenoid 37-1 is dependent upon the rate of flow of wastewater through the weir 10. When switch 44 is swung to place its actuator (arrow in FIG. 4) into registry with the position M, the contact 44-1 will be closed, and the other two contacts thereof will be opened, so that operation of both the pump motor 32-1 and the solenoid 37-1 will be responsive directly to the manual operation of the switch 43. When switch 44 is swung to register with the position T (FIG. 4), the contacts 44-1 and 44-2 are opened, and the contact 44-3 is closed to place sampler 28 under the control of the timer 45.

During a given period, for example one operating day, the makeup of wastewater from a plant may vary considerably. To get a true picture of the quantity and content of such effluent, it is important that samples be taken at intervals that are proportionate to the rate of flow of the effluent, and that each such sample be equal in volume. Thus, assuming that it is desirable to procure a sample from every 1,000 gallons of effluent flowing through the weir 10, this can be done by closing switch 77 for predetermined intervals every time 1,000 gallons of wastewater passes through the weir; and assuming that switch 43 is closed to energize the sampler 28, and that switch 44 is in the position illustrated, then the terminal T1 will also become energized momentarily for every 1,000 gallons of effluent, thereby energizing solenoid 37-1 long enough to cause valve 37 to divert a predetermined quantity of effluent from the recirculating line 40 to the sample line 38 (FIG. 2). As noted hereinafter, the operating interval of the valve 37 will depend upon the interval for which the timer 75 is set.

In use, if a sample is to be taken for every 1,000 gallons of effluent, the predetermining counter 26 is set manually, for example by means of its thumb wheels 26-1, for a count of ten; and switch 44 is set to its automatic flow control position F (FIG. 4). Switch 50 is then closed to supply AC power to the apparatus, thereby energizing the DC power supply 52. The amplifiers 56, 59 and 72 are thus energized by their DC power supply lines 56-1, 59-1 and 72-1, respectively; and timer 75 is also enabled. A manually operable switch 80 is then moved to its closed position to supply AC power through lines 81 and 82 to the motor (not illustrated) for the chart drive for recorder 20, which then produces, in known manner, a graphic record of the changes in the flow rate of the effluent as indicated by the changes in the signals from transmitter 13. Switch 69 is also closed at this time to enable signals to be applied from the integrator unit 24 to counter 26.

At this time the signal from the transmitter 13 passes through the operating coils of the recorder 20 and meter 22 to the input of the integrator formed by amplifier 56, and the condenser C1 connected in its feedback circuit. This input signal causes an output voltage equal to the integral of Idt (where I is the input current, and t is time) to build up on line 58 and across condenser C1. At any instant, therefore, the voltage on line 58 will be directly proportionate to the number of gallons of water that have passed through the flume 10 in the preceding interval during which a charge or voltage has been building up across condenser C1.

By prior adjustment of the potentiometer 61, the amplifier 59 has been set to retain its output low until the voltage on line 58 has reached a predetermined value corresponding, for example, to the passage of 100 gallons of water through flume 10. Each time the voltage on line 58 attains this predetermined value the threshhold voltage of the amplifier 59 is reached, and the output thereof goes high to produce on line 66 a voltage pulse, which momentarily energizes relay 67 to close switch 65, thereby discharging the condenser C1 through resistor R2. This removes from line 58 the voltage previously developed thereon by the input signal that was applied to amplifier 56 from transmitter 13, and consequently causes the output of amplifier 59 to drop to its low state thereby to deenergize coil 67 and to allow switch 65 to reopen.

At this time the voltage on lie 58 immediately begins to rise in response to any input signal that is applied by the transmitter to amplifier 56, and upon reaching the predetermined value corresponding to the next 100 gallons of flow through flume 10, the output of amplifier 59 is pulsed and condenser C1 is discharged as noted above. In this manner, the output of amplifier 59 is pulsed once for each successive 100 gallons of water that flow through flume 10.

Each pulse developed at the output of amplifier 59 is also applied simultaneously through line 68 to the input of register 25, and through switch 69 (now-closed) to the operating coil of counter 26. Each pulse into register 25 causes its display to increase by one, thus recording successive 100 gallons of flow in units of one. Each pulse into the counter 26 causes the counter to count down or backwardly toward zero from its preset count of ten. Consequently, each time a signal appears on line 68, the flow totalizer 25 counts upwardly one digit, while the counter 26 counts downwardly.

When ten pulses have been applied to counter 26, which is equivalent to the passage of 1,000 gallons of wastewater through the weir 10, the counter 26 automatically and momentarily closes the switch 70, thereby momentarily causing the output of amplifier 72 to pulse or go high. This output pulse from amplifier 72 is applied by line 73 to the reset terminal R of counter 26, thereby to return or reset the counter to a count of ten so that switch 70 reopens to remove the signal input from amplifier 72. The same pulse developed on line 73 is applied by line 74 to the input of timer 75, which operates in known manner to energize the relay coil 76, and to maintain this relay energized for an adjustable period of, for example, anywhere from 2 to 300 seconds, depending upon the adjustment of the timer. For this period coil 76 closes its switch 77 to energize lamp 78, and to apply power to the terminal T1 at the remote sampler unit 28. Consequently AC power is now applied to the solenoid 37-1, which causes the valve 37 to divert water from the recirculating line 40 to the sample line 38 until the timer 75 finally times out and allows switch 77 to reopen. The lamp 72 now becomes deenergized to indicate that the sample unit is no longer operating to select a sample from the effluent.

It will be noted, that during the period of time that the solenoid 37-1 of the sampler unit 28 is energized, the predetermining counter 26 has been reset, and has already commenced to count down toward a zero position corresponding to the flow of the next 1,000 gallons of water through weir 10. Thus, there is no interruption of the monitoring and sampling control device during the period of time that the sampler 28 is operating. When the counter 26 has once again counted down to zero, the sampler 28 will operate as above described to collect another sample of the effluent.

From the foregoing it will be apparent that the instant invention provides extremely accurate and reliable equipment for automatically sampling and monitoring a remotely located effluent or wastewater discharge. The signal which is developed by the probe 14 and transmitter 13 is accumulated by the integrator 24, which then produces a triggering signal every time the voltage on line 58 reaches a value corresponding to the passage of 100 gallons through weir 10. The triggering signals count upwardly on the totalizer 25 to record the effluent flow in hundreds of gallons. Counter 26 is used to select the interval at which the samples are to be procured from the effluent, each interval corresponding to a predetermined number of gallons of effluent. It is set for this particular quantity in multiples or counts of 100 gallons, so that each signal developed by the amplifier 59 causes the counter 26 to count downwardly, when the switch 69 is closed, until its zero value is reached, at which time switch 70 closes momentarily to actuate the sampler 28 for an interval controlled by the setting of timer 75.

The exact quantity of water that is diverted to the sample line 38 each time the solenoid 37-1 is energized will depend upon the interval it takes the switch 77 to reopen after each energization of the timer 75. Thus, assuming that the specifications call for water samples to be taken every 3,000 gallons for 1-½ minutes, this would be accomplished by setting the counter 26 to a present count of 0030, and setting the timer 75 for a 90 second interval—i.e., switch 77 remains closed for 90 seconds each time relay coil 76 is energized, thus holding switch 77 closed for the same interval. Regardless of the selected sampling interval, however, the sampler 28 will always operate in proportion to the rate of flow of effluent through the weir 10. For example, if the specifications required that, for an effluent flow rate of 1,000 gallons per minute, the sampler 28 have a turn-on time of 3 minutes at essentially full-duty cycle (1,000 gal. per minute), then as soon as the 3-minute sampler interval finished, the unit 28, after the resetting of counter 26, would immediately be turned on again to begin another 3 minute sample period. If, however, the flow rate were to drop to 500 gallons per minute, then the sampler 28 will operate at fifty percent duty cycle, which means that after the 3 minute sampling interval, a 3 minute power-off (solenoid 37-1 deenergized) period would occur before the sampler would again be turned on to collect a sample. The sampler duty cycle (ratio of on-time to on-time plus off-time) is thus controlled in proportion to the rate of flow of the effluent.

Although in the embodiment illustrated a capacitance level measuring probe 14 is employed in conjunction with the open weir, it will be apparent to one skilled in the art that the system is equally applicable to the measurement of water flow in a closed pipe or system in which a transducer or pressure responsive element could be employed for detecting changes in the rate of flow of the effluent, and for developing an output signal proportional thereto.

The transmitter 13 produces an output in a 4–20 milliamps range with zero set potentiometers for zero and full scale, and is calibrated to give 0–1 gallons/min. full scale or 0–10, 0–100 and 0–1000 gallons/min. full scale, depending upon selection of the weir or pipe 10. Also, the 0 to 20 ma full scale output of the meter 22 can be calibrated in known manner to correspond to 0–5, 0–10, 0–20 or 0–75 gallons per minute merely by using properly marked dial plates in the meter. Multiples of 10 of these numbers are taken care of by the selection of the sluice or pipe, as noted above.

A further advantage of the sampling apparatus described herein is that, under normal operating conditions, the pump 32 operates at all times continuously to recirculate a quantity of water through the diverter valve 37; and it is only upon receipt of an enabling signal from panel 18 that the valve 37 is energized long enough to divert a predetermined quantity of the flowing wastewater to the sample line 38. Otherwise the pump recirculates wastewater through the outlet 41 and back into the weir 10, so that there is no build-up of sediment in the sampling unit 28. This also eliminates undesirable time lags between the triggering of the sampling unit 28 and the actual collection of the sample itself, thus giving extremely accurate measurements.

Having thus described our invention, what we claim is:

1. The method of sampling a flowing fluid, comprising
   developing a first signal which varies in proportion to the rate of flow of a fluid past a station,
   at intervals producing from said first signal a second signal representative of a predetermined quantity of fluid that has passed said station during the preceding interval,
   recording said second signals,
   momentarily developing a triggering signal each time a predetermined number of said second signals are recorded, and
   automatically diverting part of said fluid for a predetermined time from said station to a sample collection station each time said triggering signal is developed.

2. The method as defined in claim 1, including
   integrating said first signal in the intervals between said second signals to produce a third signal which increases in proportion with the quantity of fluid that passes said station, and
   momentarily developing said second signal each time said third signal reaches a predetermined value.

3. The method of controlling a signal-responsive sampling device from a control station that is remote from a sampling station where said device is located, comprising
   developing at said sampling station a first signal which is proportionate to the rate of flow of fluid past said sampling station,
   transmitting said first signal to a control station remote from the sampling station,
   integrating said first signal at said control station to produce a second signal each time a predetermined quantity of fluid has passed said sampling station,
   recording said second signals at said control station, and
   transmitting an enabling signal of predetermined duration from said control station to said sampling device to actuate said device for said duration each time a predetermined number of said second signals have been recorded at said control station.

4. Apparatus for periodically sampling a flowing fluid, comprising
  means for developing a first signal proportionate to the rate of flow of a fluid past a sampling station,
  means for intermittently producing from said first signal a second signal representative of a predetermined quantity of fluid that has passed said station during the preceding interval,
  means for recording said second signals,
  means operative momentarily to develop a triggering signal each time a predetermined number of said second signals have been recorded by said recording means, and
  sampler means mounted adjacent said sampling station and responsive to said triggering signal automatically to divert part of said fluid to a sample collecting station each time said triggering signal is developed.

5. Apparatus as defined in claim 4, including adjustable means for preselecting said predetermined number of recorded second signals necessary to effect development of said triggering signal.

6. Apparatus as defined in claim 4, wherein said signal producing means comprises
  signal integrating means operative during intervals between said second signals to develop a third signal which changes from a first to a second valve in proportion to the quantity of fluid that passes said station during an interval, and
  means operative simultaneously to generate one of said second signals and to return said third signal to its first value each time said third signal reaches said second value.

7. Apparatus as defined in claim 6, wherein the last-named means includes means for adjusting said second value of said third signal thereby to preselect the quantity of fluid which must pass said station in the interval between successive second signals.

8. Apparatus as defined in claim 6, wherein
  said recording means comprises a presettable counter having an input connected to the output of said signal generating means to receive said second signals therefrom, and operative to produce said triggering signal each time a preselected number of said second signals are applied to said counter input, and
  said counter includes manually adjustable means to preselect the number of said second signals necessary to produce said triggering signal.

9. Apparatus as defined in claim 8, including a further register connected to the output of said signal generating means and operative to record the cumulative total of said second signals.

10. Apparatus as defined in claim 4, wherein said sampler means comprises
  a pump having an inlet communicating with said flowing fluid adjacent said station,
  means for operating said pump, and
  means including a valve connected to the output of said pump normally to recirculate a portion of said fluid through said pump and said valve back to the flowing fluid, and actuatable in response to each of said triggering signals to divert said portion of said fluid to a sample collector for a predetermined interval.

11. Remote controlled sampling apparatus, comprising
  a pump mounted adjacent a sampling station, and having an inlet connected to a supply of fluid flowing past said station,
  a two-position valve connected to the output of said pump and normally disposed in a first position in which it recirculates fluid from said pump back to the flowing fluid, when said pump is operating,
  means adjacent said station for developing a first electrical signal proportionate to the rate of flow of said fluid past said inlet,
  means for transmitting said first signal to a station remote from said sampling station,
  means at said remote station for intermittently producing from said first signal a second signal, each of said signals being representative of a predetermined quantity of fluid that has passed said inlet during the preceding interval,
  means at said remote station for recording said second signals, and
  means operative automatically to move said valve to a second position in which it diverts fluid from said pump to a sample collector, each time a predetermined number of said second signals are recorded by said recording means.

12. Remote controlled apparatus as defined in claim 11, including means at said remote station adjustable to preselect said predetermined number of second signals required to effect movement of said valve to its second position.

13. Remote controlled apparatus as defined in claim 11, wherein
  said producing means comprises means for accumulating in each interval between successive second signals a third signal which increases in proportion to the quantity of fluid that passes said inlet during the interval, and operative to produce one of said second signals each time said third signal reaches a predetermined value,
  a presettable counting device is connected to the output of the last-named means to count said second signals, and is operative to produce a triggering signal upon receipt of a predetermined number of said second signals, and
  said valve moving means comprises electrical means responsive to said triggering signal to effect movement of said valve to its second position for a predetermined period of time.

14. Remote controlled apparatus as defined in claim 13, wherein
  said presettable counting device is manually adjustable to preselect the number of said second signals necessary to produce said triggering signal, and
  said electrical means includes a time delay device operative during the intervals between said triggering signals for retaining said valve in its second position for a predetermined period of time, each time said valve is shifted to its second position.

15. Remote controlled apparatus as defined in claim 13, including
  means at said remote station responsive to said signal from said sampling station to indicate visually the rate of flow of said fluid at any instant, and a second register connected to the output of said last-named means to record cumulatively the number of said second signals produced over an extended period of time.

\* \* \* \* \*